Oct. 24, 1933.  H. SMITH  1,932,149
PROCESS AND APPARATUS FOR BREAKING OFF LENGTHS OF WIRED GLASS
Filed Aug. 1, 1932
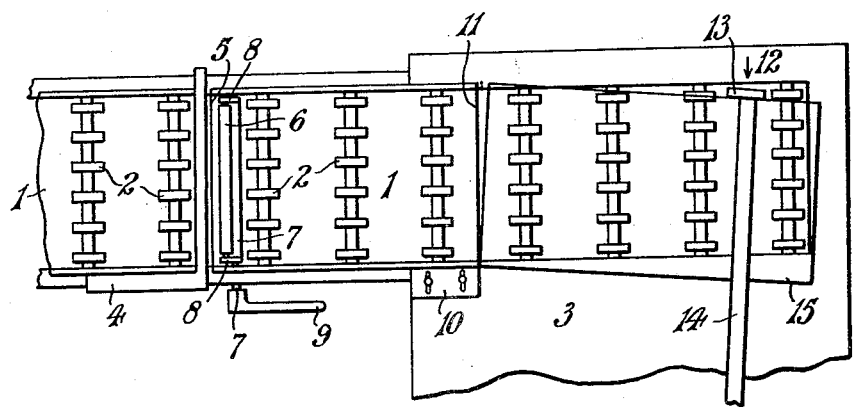
Inventor.
Harry Smith
By Morrison, Kennedy & Campbell
Attys.

Patented Oct. 24, 1933

1,932,149

UNITED STATES PATENT OFFICE 1,932,149

PROCESS AND APPARATUS FOR BREAKING OFF LENGTHS OF WIRED GLASS

Harry Smith, St. Helens, England, assignor to Pilkington Brothers Limited, Liverpool, England, a corporation of England Application August 1, 1932, Serial No. 627,198, and in Great Britain August 6, 1931

4 Claims. (Cl. 49—48)

This invention relates to a process of, and apparatus for, breaking off lengths of wired glass from a continuous strip on a bed.

In the formation of a continuous strip of wired glass, in which the strip travels slowly over a bed of rollers, slats or the like, the methods of breaking glass ordinarily used are not applicable and it has been found so difficult to break off lengths of strip that such strip has been made with wire net cut into the desired lengths before insertion in the glass.

According to the invention, the strip, after the glass has been scored and snapped, is broken by applying a bending moment to the strip along the cut edgewise of the strip. The bending moment is applied by applying pressure to one edge of the piece to be broken off in the direction of its plane, so as to tear the longitudinal wire successively, starting from the edge to which pressure is applied, the piece being thereby given a pivoting movement in its plane about the end of the cut at the other edge. In this way the strip, including the broken off portion rests on the bed, and very large pieces can be broken off without the use of lifting and holding appliances.

The accompanying drawing is a plan of a portion of a roller bed and cutting table.

In the said drawing, 1 is a strip of glass travelling from left to right over the bed of disc rollers 2, which, in the ordinary use of the device, is the bed which receives the strip at the exit of the lehr. The glass strip is supposed to be transparent, showing the parts beneath it, the wire net not being shown. A cutting table 3 is disposed about the end of the roller bed, as is usual for cutting ordinary glass.

Cutting means are employed to score and snap the glass at a point before the table 3. Any of the known automatic cutting means may be employed, but in the device as shown, a square 4 is used and the score 5 is made by hand. In this case the glass is snapped along the score 5 by raising it from the bed, so that it is snapped by its own weight. One of the usual methods of doing this is shown in which the roller 6 is mounted eccentrically to a shaft 7 by bearing blocks 8, so that, when an arm 9 on the shaft 7 is depressed, the roller 6, which is in contact with the glass, is raised. A block 10 is fixed to the table 3 in such a position that one edge of the glass travels in contact with, or just clear of it, its position being preferably adjustable. When the cut across the strip reaches the forward corner of the block 10, and is in the position shown by the line 11, the wire net is torn across by pressure applied to the other edge of the strip, as indicated by the arrow 12, the point at which pressure is applied being chosen at a distance forward of the cut to give sufficient leverage about the forward corner of the block 10; which acts as a fulcrum, to tear the wire net, as indicated in the drawing, which shows the piece of strip 15 partly torn away from the main strip 1.

The tearing across of the wire net may be done by hand, by a tool of which the end 13 engages the edge of the glass, while the handle 14 is pulled by the operator. Since the movement of the piece of glass cut off is a pivoting movement about one end of the cut, the longitudinal wires of the net are broken one by one, starting from the end of the cut distant from the pivoting point, and therefore only a comparatively small force is required to break the net. The broken off piece remains in the plane of the bed and the movement required to break it may be continued so as to draw it away from the path of the travelling strip.

The hand tool 13, 14, may be replaced by any convenient mechanically operated device adapted to apply pressure in the direction of the arrow 12.

Having described my invention, I declare that what I claim and desire to secure by Letters Patent is:—

1. A process of breaking wire net glass strip which comprises scoring the glass along a line transversely thereof, snapping the glass to break only the glass along the scored line and then moving the snapped off length in its plane substantially laterally to tear the wire net.

2. A process of breaking wire net glass strip which comprises scoring the glass along a line transversely thereof, snapping the glass to break only the glass along the scored line and then moving the snapped off length in its plane substantially laterally so as to pivot said length about one end of the break in the glass until the wire net is torn.

3. A process of breaking wire net glass which comprises scoring the glass along a line transversely thereof, snapping the glass to break only the glass along the scored line, and then tearing the wire net by applying pressure transversely in the plane of the strip at the forward end of one edge, while holding the unbroken strip against the said pressure.

4. Apparatus for breaking wire net glass strip comprising means for scoring and snapping the glass only, means to apply lateral pressure in the plane of the strip to the edge of the strip at a point forward of the cut and an abutment engaging the other edge of the strip immediately behind the cut to prevent lateral movement of the unbroken portion of strip.

HARRY SMITH.